United States Patent
Kang et al.

(10) Patent No.: US 9,490,982 B2
(45) Date of Patent: *Nov. 8, 2016

(54) METHOD AND STORAGE DEVICE FOR PROTECTING CONTENT

(71) Applicant: Samsung Electronics Co., Ltd., Gyeonggi-do (KR)

(72) Inventors: Bo-Gyeong Kang, Gyeonggi-do (KR); Ji-Soo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,886

(22) Filed: May 11, 2015

(65) Prior Publication Data
US 2015/0249538 A1    Sep. 3, 2015

Related U.S. Application Data

(63) Continuation of application No. 13/676,759, filed on Nov. 14, 2012, now Pat. No. 9,031,233.

(30) Foreign Application Priority Data

Nov. 14, 2011    (KR) .......................... 10-2011-0118459

(51) Int. Cl.
*H04L 9/08*    (2006.01)
*H04L 29/06*    (2006.01)
(Continued)

(52) U.S. Cl.
CPC ............. *H04L 9/3226* (2013.01); *G06F 21/78* (2013.01); *H04L 9/0866* (2013.01);
(Continued)

(58) Field of Classification Search
CPC . H04L 63/123; H04L 9/0866; H04L 9/0869; H04L 9/0894; H04L 9/3271; H04L 9/3226; G06F 21/78; G06F 2221/2107
See application file for complete search history.

(56) References Cited

U.S. PATENT DOCUMENTS

2002/0002674 A1*  1/2002  Grimes ................... G06F 21/10
                                                                      713/156
2003/0105967 A1*  6/2003  Nam ................... G06F 12/1408
                                                                      713/189
(Continued)

FOREIGN PATENT DOCUMENTS

CN          101409620        4/2009
EP            2037389        3/2009
(Continued)

OTHER PUBLICATIONS

European Search Report dated Jun. 26, 2015 issued in counterpart application No. 12849982.9-1870, 7 pages.
(Continued)

*Primary Examiner* — Yonas Bayou
(74) *Attorney, Agent, or Firm* — The Farrell Law Firm, P.C.

(57) ABSTRACT

A method for authenticating a memory device by a controller device. The method including sending, to the memory device by the controller device, a pre-stored number, a random number and information related to a key which is stored in the memory device; receiving, by the controller device, authentication information from the memory device; verifying, by the controller device, the authentication information using verification data; and if verification succeeds, generating, by the controller device, an Enhanced Media IDentifier (EMID) using a pre-stored value and unique information related to the memory device.

20 Claims, 4 Drawing Sheets

(51) Int. Cl.
*H04L 9/32* (2006.01)
*G06F 21/78* (2013.01)

(52) U.S. Cl.
CPC .......... *H04L 9/0869* (2013.01); *H04L 9/0894* (2013.01); *H04L 9/3271* (2013.01); *H04L 63/123* (2013.01); *G06F 2221/2107* (2013.01)

(56) References Cited

U.S. PATENT DOCUMENTS

| | | | |
|---|---|---|---|
| 2003/0145211 A1* | 7/2003 | Fukawa | G06F 21/10 713/182 |
| 2007/0180539 A1 | 8/2007 | Holtzman et al. | |
| 2007/0192610 A1* | 8/2007 | Chun | G06F 21/64 713/176 |
| 2008/0232592 A1 | 9/2008 | Lee et al. | |
| 2009/0100530 A1* | 4/2009 | Chen | H04L 9/3271 726/29 |
| 2009/0296937 A1 | 12/2009 | Suu et al. | |
| 2010/0153672 A1* | 6/2010 | Jogand-Coulomb | G06F 13/4243 711/164 |
| 2010/0268953 A1* | 10/2010 | Matsukawa | G06F 21/10 713/171 |
| 2010/0275036 A1* | 10/2010 | Harada | G06F 21/10 713/189 |
| 2011/0093705 A1* | 4/2011 | Liu | G06F 21/6272 713/168 |
| 2011/0222691 A1* | 9/2011 | Yamaguchi | G06F 21/10 380/278 |
| 2012/0254630 A1* | 10/2012 | Kang | G06F 21/10 713/193 |
| 2012/0303974 A1* | 11/2012 | Lin | G06F 21/10 713/193 |
| 2013/0142325 A1* | 6/2013 | Nagai | H04L 9/0816 380/28 |
| 2015/0012936 A1 | 1/2015 | Chen | |

FOREIGN PATENT DOCUMENTS

| | | |
|---|---|---|
| EP | 2 051 475 | 4/2009 |
| JP | 2000-286839 | 10/2000 |
| KR | 1020070103741 | 10/2007 |
| WO | WO 2007/138486 | 12/2007 |
| WO | WO 2009/027125 | 3/2009 |

OTHER PUBLICATIONS

Chinese Office Action dated May 17, 2016 issued in counterpart application No. 201280054981.7, 14 pages.

* cited by examiner

METHOD AND STORAGE DEVICE FOR PROTECTING CONTENT

PRIORITY

This continuation application claims priority under 35 U.S.C. §120 to U.S. patent application Ser. No. 13/676,759 (now in condition for allowance), filed on Nov. 14, 2012 in the United States Patent and Trademark Office, which claimed priority under 35 U.S.C. §119(a) to a Korean Patent Application filed on Nov. 14, 2011 in the Korean Intellectual Property Office and assigned Serial No. 10-2011-0118459, the entire contents of each of which are incorporated herein by reference.

BACKGROUND OF THE INVENTION

1. Field of the Invention

The present invention relates generally to a method for protecting content, and more particularly, to a method for securely storing, reproducing, and managing content using user secret information and an IDentifier (ID) unique to a storage device.

2. Description of the Related Art

In Full Disk Encryption (FDE), content is encrypted using user secret information (e.g. a Personal Identification Number (PIN)) and stored in a storage device (e.g. a Solid State Drive (SSD), a Universal Serial Bus (USB), a Secure Digital (SD) card, etc.). Upon receipt of the user secret information, an encryption module of the storage device decrypts the content using the user secret information. Accordingly, the security of the content depends only on user secret information when a storage device that stores encrypted content is duplicated.

User secret information tends to be easily memorized, which makes it relatively easy to estimate. Moreover, careless management of a service provider or a server can cause user information to be exposed. As a result, security cannot be sufficiently ensured when the security depends only on user secret information.

Conventionally, a value set (or calculated) based on user-input secret information is directly used in encryption/decryption of information stored in a storage device. A user can memorize the amount of secret information that can the user can input, and the information can be derived for other services. Therefore, the secret information is vulnerable to exposure due to disclosure of personal information in the service industry.

Accordingly, even though storage media is conventionally encrypted, enhanced security is not conventionally ensured because the storage media depends only on user secret information.

SUMMARY OF THE INVENTION

The present invention is designed to address at least the above-described problems and/or disadvantages and to provide at least the advantages described below. Accordingly, an aspect of the present invention is to provide a method for generating a key for disk encryption, encrypting and decrypting information using the key, and a method for binding an additional device even when user information is exposed, in a technology such as FDE.

In accordance with an aspect of the present invention, there is provided a method for authenticating a memory device by a controller device. The method includes sending, to the memory device by the controller device, a pre-stored number, a random number and information related to a key which is stored in the memory device; receiving, by the controller device, authentication information from the memory device; verifying, by the controller device, the authentication information using verification data; and if verification succeeds, generating, by the controller device, an Enhanced Media IDentifier (EMID) using a pre-stored value and unique information related to the memory device.

In accordance with another aspect of the present invention, there is provided a non-transitory computer-readable recording medium having recorded thereon a computer program for executing a method of authenticating a memory device by a controller device. The method includes sending, to the memory device by the controller device, a pre-stored number, a random number and information related to a key which is stored in the memory device; receiving, by the controller device, authentication information from the memory device; verifying, by the controller device, the authentication information using verification data; and if verification succeeds, generating, by the controller device, an Enhanced Media IDentifier (EMID) using a pre-stored value and unique information related to the memory device.

In accordance with another aspect of the present invention, there is provided a controller device for authenticating a memory device. The controller device includes a non-transitory storage area for storing a pre-stored number and a pre-stored value; and a controller configured to send, to the memory device, the pre-stored number, a random number and information related to a key; receive authentication information from the memory device; verify the authentication information using verification data; and if the verification succeeds, generate an Enhanced Media IDentifier (EMID) using a pre-stored value and unique information related to the memory device.

In accordance with another aspect of the present invention, there is provided a method for performing authentication between a memory device and a controller device. The method includes sending, to the controller device by the memory device, data including information related to a key which is stored in the memory device; receiving, from the controller device by the memory device, a number pre-stored in the controller device, a random number and the information related to the key; generating, by the memory device, authentication information based on the key which is stored in the memory device and corresponds to the information; and sending, by the memory device, the authentication information to the controller device.

In accordance with another aspect of the present invention, there is provided a memory device for performing authentication between the memory device and a controller device. The memory device includes at least one non-transitory storage area for storing unique information related to the memory device and a plurality of keys; and a processor configured to send, to the controller device, data including information related to a key from among the plurality of keys; receive, from the controller device, a number pre-stored in the controller device, a random number and the information related to the key; generate authentication information based on the key which is one of the plurality of keys and corresponds to the information related to the key; and send the authentication information to the controller device.

BRIEF DESCRIPTION OF THE DRAWINGS

The above and other aspects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Hereinafter, embodiments of the present invention will be described in detail with reference to the attached drawings. A detailed description of a generally known function and structure of the present invention will be omitted for the sake of clarity and conciseness.

Figure 1:
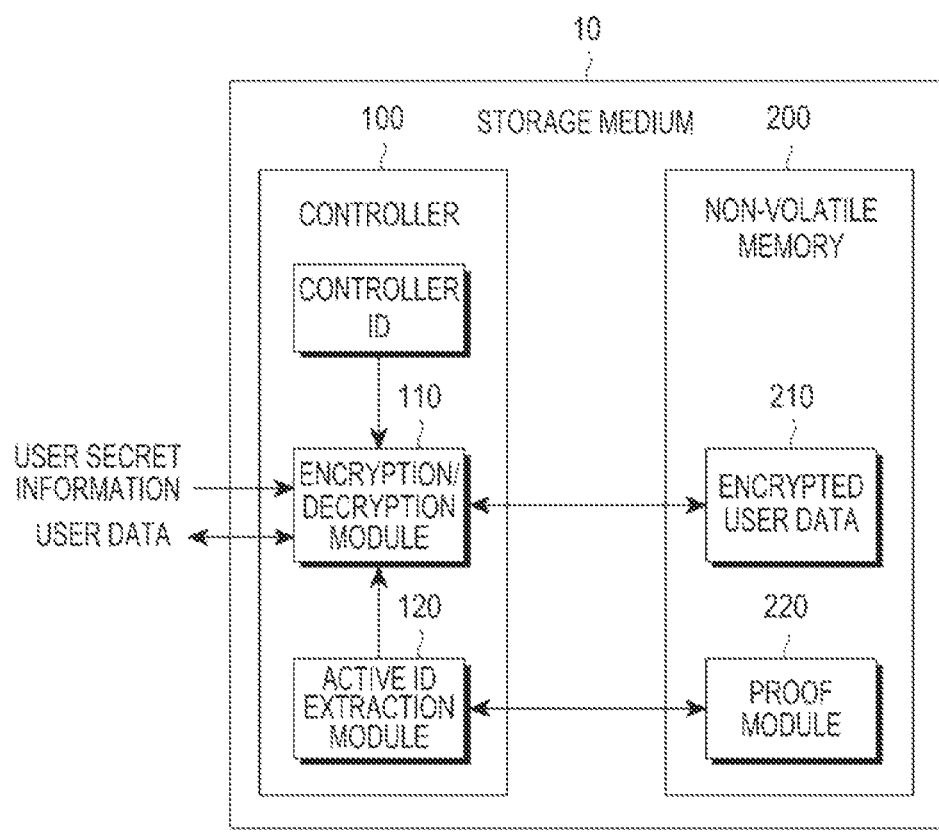
FIG. 1 illustrates a storage device according to an embodiment of the present invention.

FIG. 1 illustrates a storage device according to an embodiment of the present invention. The storage device 10 includes a controller 100 and a non-volatile memory 200.

The storage device 10 includes a non-volatile memory 200 for securely storing media content-related information. For example, the non-volatile memory 200 may be a Secure Digital (SD) card, a Universal Serial Memory (USB) memory, a Solid State Drive (SSD), or a Hard Disk Drive (HDD). The storage device 10 is connected or mounted to a host device (not shown) such as a portable communication terminal or a computer. Upon request of the host device, the storage device 10 stores data received from the host device in the non-volatile memory 200 and outputs data retrieved from the non-volatile memory 200 to the host device. For recoding and reading data, the storage device 10 encrypts and decrypts data using a Data Encryption Key (DEK).

The non-volatile memory 200 stores data, is managed by the controller 100, and includes a proof module 220 for performing an authentication function in interaction with an active ID extraction module 120 of the controller 100 in response to a command received from the controller 100. The non-volatile memory 200 further includes a user data storage area 210 for storing encrypted user data.

The controller 100 manages data input and output of the non-volatile memory 200. The controller 100 includes an encryption/decryption module 110 and the active ID extraction module 120.

The encryption/decryption module 110 encrypts data received from the host device and stores the encrypted data in the non-volatile memory 200. The encryption/decryption module 110 also decrypts encrypted data received from the non-volatile memory 200 and outputs the decrypted data to the host device. The active ID extraction module 120 generates an active ID for use in encrypting a DEK used for encryption of the data and outputs the active ID to the encryption/decryption module 110. Herein, the term "module" refers to hardware or a combination of hardware and software.

Figure 2:
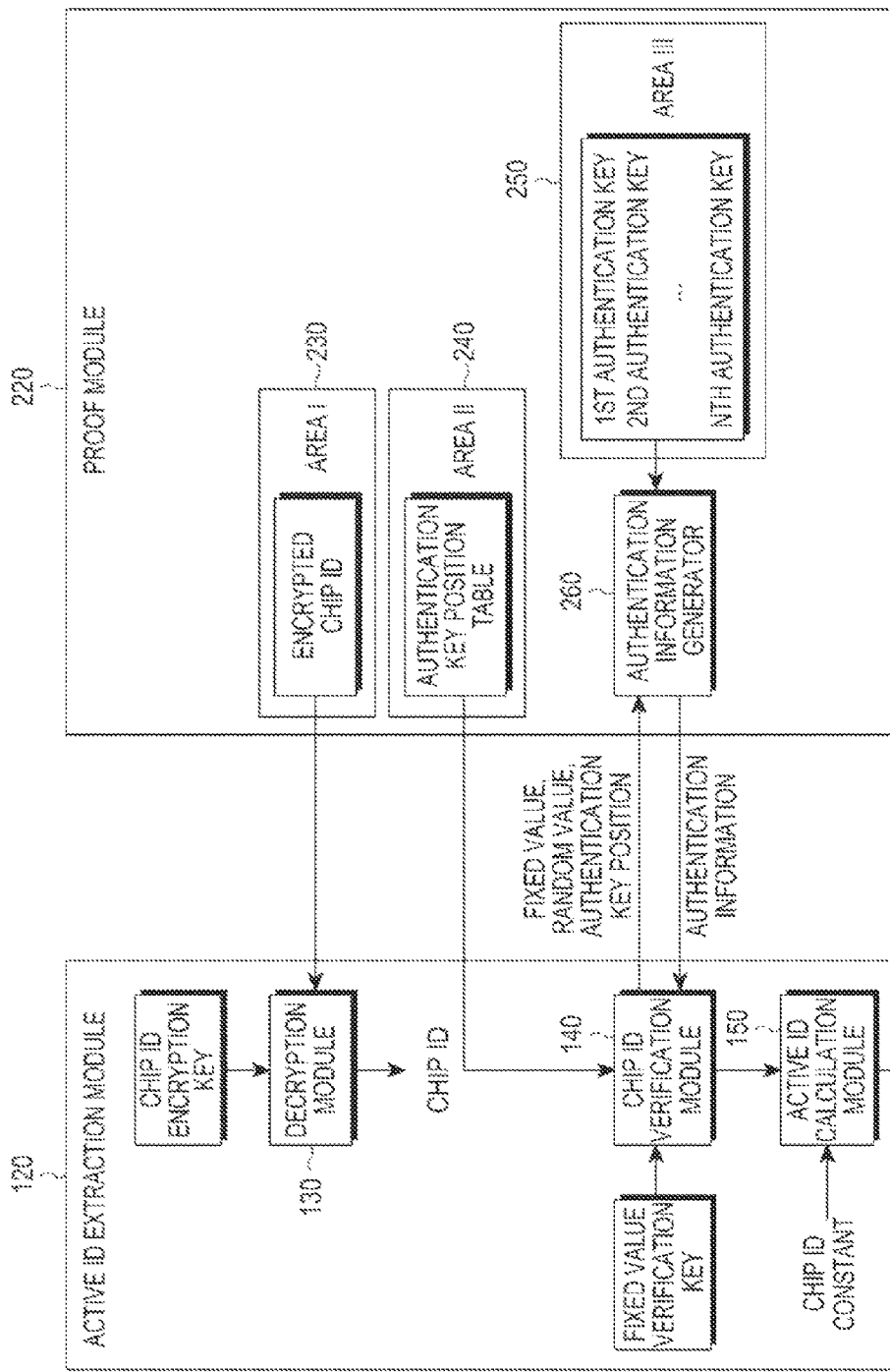
FIG. 2 illustrates an active ID extraction module and a proof module according to an embodiment of the present invention.

FIG. 2 illustrates the active ID extraction module and the proof module according to an embodiment of the present invention.

The active ID extraction module 120 includes a decryption module 130, a ChipID verification module 140, and an active ID calculation module 150. Though not shown in FIG. 2, the active ID extraction module 120 may further include an encryption module for generating an encrypted ChipID.

The decryption module 130 receives an encrypted ChipID 230 from the proof module 220, decrypts the encrypted ChipID 230 using a ChipID encryption key, and outputs the resulting ChipID as the ID of the non-volatile memory. The remaining reference numerals shown in FIG. 2 will now be discussed in reference to FIGS. 2 and 3.

Figure 3:
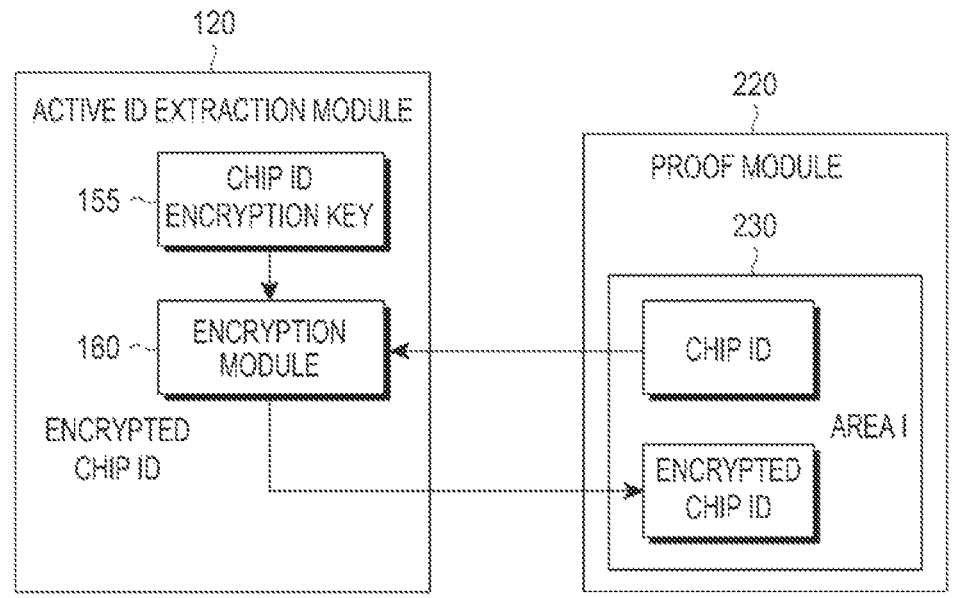
FIG. 3 illustrates a method for generating and store an encrypted ChipID according to an embodiment of the present invention.

FIG. 3 illustrates a method for generating and storing an encrypted ChipID according to an embodiment of the present invention. An encryption module 160 in the active ID extraction module 120 receives a ChipID stored in a first storage area 230 from the proof module 220, encrypts the ChipID using a ChipID encryption key 155, and stores the encrypted ChipID in the first storage area 230. The ChipID stored in the first storage area 230 may be deleted or moved to a second storage area. For instance, the encrypted ChipID may be generated by Equation (1), as follows:

$$AES(\text{ChipID encryption key, ChipID}) = \text{encrypted ChipID} \quad (1)$$

Referring to FIG. 2, the ChipID verification module 140 requests an authentication key position table to the proof module 220, receives the requested authentication key table from the proof module 220, and transmits a fixed value, a random value, and information about the position of an authentication key to the proof module 220. The values and information are used in authentication and are pre-stored in the active ID extraction module 120. The ChipID verification module 140 receives authentication information from the proof module 220, verifies the authentication information using a verification key pre-stored in the active ID extraction module 120, and determines according to the verification result whether the authentication is successful.

If the authentication of the non-volatile memory 200 is successful, the active ID calculation module 150 generates an active ID by substituting the ChipID received from the decryption module 130 and a constant pre-stored in the active ID extraction module 120 into a one-way function and outputs the active ID to the encryption/decryption module 110. The one-way function may be a hash function. The active ID, Enhanced Media ID (EMID) may be generated in Equation (2).

$$\text{One-way function (ChipID, constant)} = \text{EMID} \quad (2)$$

The proof module 220 includes first, second, and third storage areas 230, 240 and 250 and an authentication information generator 260.

The first storage area 230 is writable only once by the controller 100 and then is only readable. The encrypted ChipID is stored in the first storage area 230.

The second storage area 240 is a read-only area for storing and managing the authentication key position table.

The third storage area 250 for storing authentication keys is programmed during creation of the non-volatile memory 200, after which information cannot be written therein. Particularly, the third storage area 250 may be configured into a One Time Programmable (OTP) area. Direct read and test commands are not allowed for information stored in the OTP area, and the information is transmitted to the authentication information generator 260.

The authentication information generator 260 receives the fixed value, the random value, and the information about the position of an authentication key from the ChipID verification module 140 and transmits authentication information including an authentication key corresponding to the position information to the ChipID verification module 140.

Figure 4:
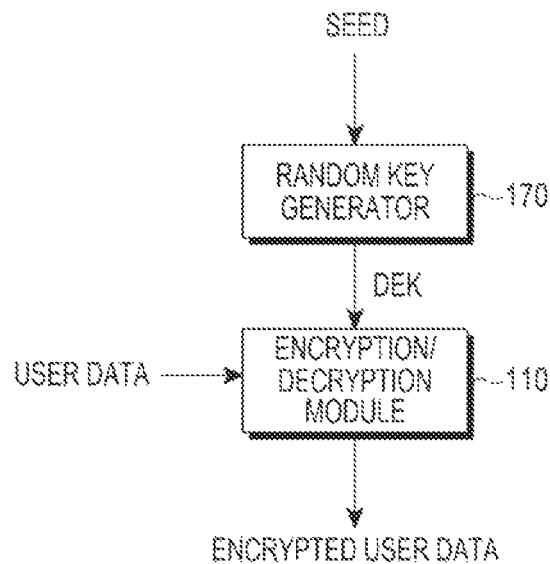
FIG. 4 illustrates a method for generating a data encryption key according to an embodiment of the present invention.

FIG. 4 illustrates a method for generating a DEK according to an embodiment of the present invention. A random key generator 170 of the controller 100 receives a seed value and generates a random DEK using the seed value. The encryption/decryption module 110 encrypts data received from the host device using the DEK received from the random key generator 170 and stores the encrypted data in the non-volatile memory 200. Though not shown in FIG. 1, the random key generator 170 may be provided within the encryption/decryption module 110.

Figure 5:
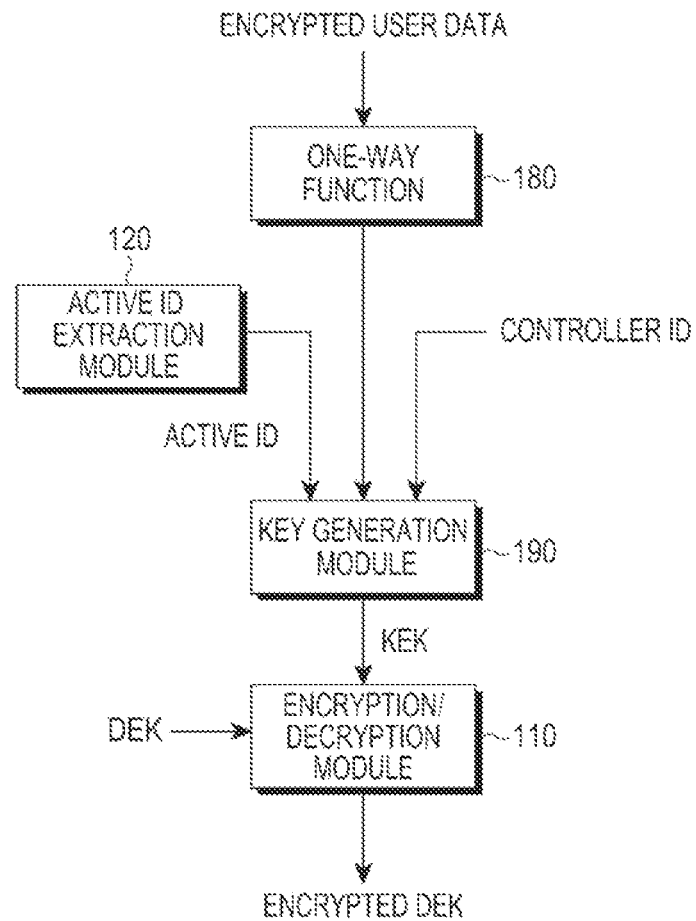
FIG. 5 illustrates a method for an encrypted data encryption key according to an embodiment of the present invention.

FIG. 5 illustrates a method for an encrypted data encryption key according to an embodiment of the present invention. A key generation module 190 of the controller 100 generates a Key for the DEK (KEK) using user secret information (e.g. a password) processed by a one-way function 180, the active ID received from the active ID extraction module 120, and a controller ID (the KEK may be generated using the afore-described one-way function key). The encryption/decryption module 110 encrypts the DEK using the KEK received from the key generation module 190. The encrypted DEK is stored in the non-volatile memory 200, for example, in the first storage area 230. Unlike the configuration illustrated in FIG. 1, the one-way function 180 and the key generation module 190 may reside in the encryption/decryption module 110.

As is apparent from the above description, the present invention provides a technology robust against attacks such as illegal copy and secret information estimation, by authentication of a storage device and ID-based binding of the storage device in an apparatus for encrypting and decrypting information using user secret information, such as by FDE. Therefore, when a storage device or a device including a storage device is stolen, an additional distribution of physical duplicates is minimized.

In addition, the present invention is applicable to various types of storage devices, and can be used when an Application Processor (AP) uses an off-chip non-volatile memory.

Embodiments of the present invention can be implemented in hardware or a combination of hardware and software. The software can be recorded to a volatile or non-volatile storage device such as a Read-Only Memory (ROM) irrespective of deletable or re-recordable, to a memory such as a Random Access Memory (RAM), a memory chip, a memory device, or an integrated circuit, or to a storage medium that is optically or magnetically recordable and readable by a machine (e.g. a computer), such as a Compact Disc (CD), a Digital Video Disc (DVD), a magnetic disk, or a magnetic tape. The storage is an example of a machine-readable storage medium suitable for storing a program or programs including instructions to implement the embodiments of the present invention. Accordingly, the present invention includes a program including a code for implementing the method as appended in the claims and a machine-readable storage medium that stores the program. The program may be transferred electronically through any medium such as a communication signal transmitted through a wired or wireless connection and the present invention covers equivalents thereof.

While the present invention has been particularly shown and described with reference to certain embodiments thereof, it will be understood by those of ordinary skill in the art that various changes in form and details may be made therein without departing from the spirit and scope of the present invention as defined by the following claims.

What is claimed is:

1. A method for authenticating a memory device by a controller device, the method comprising:
sending, to the memory device by the controller device, a pre-stored number, a random number and information related to a key which is stored in the memory device;
receiving, by the controller device, authentication information from the memory device;
verifying, by the controller device, the authentication information using verification data; and
if verification succeeds, generating, by the controller device, an Enhanced Media IDentifier (EMID) using a pre-stored value and unique information related to the memory device.

2. The method of claim 1, further comprising;
receiving, by the controller device, encrypted content from the memory device; and
decrypting, by the controller device, the encrypted content with a key being a random value.

3. The method of claim 1, further comprising;
reading, from the memory device by the controller device, encrypted unique information related to the memory device; and
obtaining, by the controller device, the unique information related to the memory device by decrypting the encrypted unique information related to the memory device using a key stored in the controller device.

4. The method of claim 1, further comprising:
reading, from the memory device by the controller device, data including the information related to the key.

5. The method of claim 1, further comprising:
encrypting, using the EMID, a data encryption key for encrypting data.

6. A non-transitory computer-readable recording medium having recorded thereon a computer program for executing a method of authenticating a memory device by a controller device, the method comprising:
sending, to the memory device by the controller device, a pre-stored number, a random number and information related to a key which is stored in the memory device;
receiving, by the controller device, authentication information from the memory device;
verifying, by the controller device, the authentication information using verification data; and
if verification succeeds, generating, by the controller device, an Enhanced Media IDentifier (EMID) using a pre-stored value and unique information related to the memory device.

7. The non-transitory computer-readable recording medium of claim 6, the method further comprising;
receiving, by the controller device, encrypted content from the memory device; and
decrypting, by the controller device, the encrypted content with a key being a random value.

8. The non-transitory computer-readable recording medium of claim 6, the method further comprising;
reading, from the memory device by the controller device, encrypted unique information related to the memory device; and
obtaining, by the controller device, the unique information related to the memory device by decrypting the encrypted unique information related to the memory device using a key stored in the controller device.

9. The non-transitory computer-readable recording medium of claim 6, the method further comprising reading, from the memory device by the controller device, data including the information related to the key.

10. A controller device for authenticating a memory device, comprising:
 a non-transitory storage area for storing a pre-stored number and a pre-stored value; and
 a controller configured to:
 send, to the memory device, the pre-stored number, a random number and information related to a key;
 receive authentication information from the memory device;
 verify the authentication information using verification data; and
 if the verification succeeds, generate an Enhanced Media IDentifier (EMID) using a pre-stored value and unique information related to the memory device.

11. The controller device of claim 10, wherein the controller is configured to:
 receive encrypted content from the memory device; and
 decrypt the encrypted content with a key being a random value.

12. The controller device of claim 10, wherein the controller is configured to:
 read, from the memory device, encrypted unique information related to the memory device; and
 obtain the unique information related to the memory device by decrypting the encrypted unique information related to the memory device using a key stored in the controller device.

13. The controller device of claim 10, wherein the controller is configured to read, from the memory device, data including the information related to the key.

14. A method for performing authentication between a memory device and a controller device, the method comprising:
 sending, to the controller device by the memory device, data including information related to a key which is stored in the memory device;
 receiving, from the controller device by the memory device, a number pre-stored in the controller device, a random number and the information related to the key;
 generating, by the memory device, authentication information based on the key which is stored in the memory device and corresponds to the information; and
 sending, by the memory device, the authentication information to the controller device.

15. The method of claim 14, further comprising sending, by the memory device, encrypted content to the controller device,
 wherein the encrypted content is content encrypted with a key being a random value.

16. The method of claim 14, further comprising sending, to the controller device by the memory device, unique information related to the memory device.

17. The method of claim 14, further comprising:
 if verification of the authentication information at the controller device is successful, storing an encrypted data encryption key for encrypting data,
 wherein the encrypted data encryption key is generated by using an Enhanced Media IDentifier (EMID).

18. A memory device for performing authentication between the memory device and a controller device, comprising:
 at least one non-transitory storage area for storing unique information related to the memory device and a plurality of keys; and
 a processor configured to:
 send, to the controller device, data including information related to a key from among the plurality of keys;
 receive, from the controller device, a number pre-stored in the controller device, a random number and the information related to the key;
 generate authentication information based on the key which is one of the plurality of keys and corresponds to the information related to the key; and
 send the authentication information to the controller device.

19. The memory device of claim 18, wherein the processor is configured to send encrypted content to the controller device, and
 wherein the encrypted content is content encrypted with a key being a random value.

20. The memory device of claim 18, wherein the processor is configured to send, to the controller device, encrypted unique information related to the memory device.

* * * * *